(12) United States Patent
Simpson et al.

(10) Patent No.: US 11,733,432 B1
(45) Date of Patent: Aug. 22, 2023

(54) DURABLE, OPTICALLY TRANSPARENT, AND SUPERHYDROPHOBIC COATING

(71) Applicant: Waymo LLC, Mountain View, CA (US)

(72) Inventors: John T. Simpson, Mountain View, CA (US); Bryce Remesch, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 15 days.

(21) Appl. No.: 17/363,467

(22) Filed: Jun. 30, 2021

(51) Int. Cl.
| | |
|---|---|
| *G02B 1/118* | (2015.01) |
| *G02B 1/18* | (2015.01) |
| *B05D 5/02* | (2006.01) |
| *B05D 5/08* | (2006.01) |
| *B05D 5/06* | (2006.01) |
| *B05D 3/00* | (2006.01) |

(52) U.S. Cl.
CPC ............ *G02B 1/118* (2013.01); *B05D 3/007* (2013.01); *B05D 5/02* (2013.01); *B05D 5/063* (2013.01); *B05D 5/08* (2013.01); *G02B 1/18* (2015.01); *B05D 2350/60* (2013.01); *B05D 2401/10* (2013.01); *G02B 2207/101* (2013.01); *G02B 2207/109* (2013.01)

(58) Field of Classification Search
None
See application file for complete search history.

(56) References Cited

U.S. PATENT DOCUMENTS

| | | | |
|---|---|---|---|
| 8,164,245 B2 | 4/2012 | Nishida et al. | |
| 8,467,023 B2 | 6/2013 | Nishida et al. | |
| 8,723,768 B2 | 5/2014 | Egi et al. | |
| 2021/0170443 A1* | 6/2021 | Kim | B05D 3/007 |

OTHER PUBLICATIONS

Shanmugam et al., Anti-Reflective Coating Materials: A Holistic Review from PV Perspective, Energies 2020, 13, 2631, pp. 1-93, www.mdpi.com/journal/energies.

Meng et al., Effective MgO-doped TiO2 nanoaerogel coating for crystalline silicon solar cells improvement, Int J Energy Res. 2018;42:3915-3927, 13 pages, http://wileyonlinelibrary.com/journal/er.

Hedayati et al., Antireflective Coatings: Conventional Stacking Layers and Ultrathin Plasmonic Metasurfaces, A Mini-Review, Materials 2016, 9, 497, 22 pages, http://www.mdpi.com/journal/materials.

\* cited by examiner

*Primary Examiner* — Derek S. Chapel
(74) *Attorney, Agent, or Firm* — McDonnell Boehnen Hulbert & Berghoff LLP

(57) ABSTRACT

An article including a durable, optically transparent, and superhydrophobic coating is described. In one aspect, the present disclosure provides a coating comprising a layer of aerogel disposed interstitially between spaced features extending in a direction perpendicular to a major surface of the coating, the spaced features having an average height of between 200-5000 nm and an average spacing of between 10-2000 nm, and comprising at least 75 wt. % of one or more of crystalline or amorphous silicon, an inorganic oxide, a polymer, crystalline or amorphous carbon, a carbide, or a nitride.

20 Claims, 1 Drawing Sheet

DURABLE, OPTICALLY TRANSPARENT, AND SUPERHYDROPHOBIC COATING

BACKGROUND

Unless otherwise indicated herein, the materials described in this section are not prior art to the claims in this application and are not admitted to be prior art by inclusion in this section.

Nano-textured "anti-reflective" coatings comprising arrays of elongated, nano-scale features such as cones or tapered pillars have potential application in numerous fields of endeavor. However, such conventional nano-textured surfaces are of limited use in certain optical applications, such as those involving exposure to weathering conditions, where displacement of air between the features and/or shear-force damage to the features can deleteriously affect the reflectivity of the coating.

Conventional anti-reflective coatings, then, are of limited use as coatings in certain optical applications, particularly in those involving exposure to weathering conditions.

There accordingly remains a need for durable, optically transparent coatings.

SUMMARY

In one aspect, the present disclosure provides an article comprising a substrate; and a disposed layer adjacent to the substrate, the disposed layer comprising: spaced features extending in a direction perpendicular to the substrate, and between 2-40 wt. % aerogel, wherein: the aerogel is disposed interstitially between the spaced features, the spaced features have an average height of between 200-5000 nm and an average spacing of between 10-2000 nm, and the spaced features comprise at least 75 wt. % of one or more of crystalline or amorphous silicon, an inorganic oxide, a polymer, crystalline or amorphous carbon, a carbide, or a nitride.

In another aspect, the present disclosure provides a method for preparing a coated substrate, comprising providing a precursor layer disposed on a substrate, the precursor layer having a first side facing the substrate and a second side opposite to the first side, the second side having a textured surface, the textured surface comprising spaced features extending in a direction perpendicular to the substrate; and disposing aerogel adjacent to at least a portion of the textured surface; wherein the spaced features have an average height of between 200-5000 nm and an average spacing of between 10-2000 nm; and the spaced features comprise at least 75 wt. % of one or more of crystalline or amorphous silicon, an inorganic oxide, a polymer, crystalline or amorphous carbon, a carbide, or a nitride.

These, as well as other aspects, advantages, and alternatives, will become apparent to those of ordinary skill in the art by reading the following detailed description, with reference where appropriate to the accompanying drawings.

Figure 1:
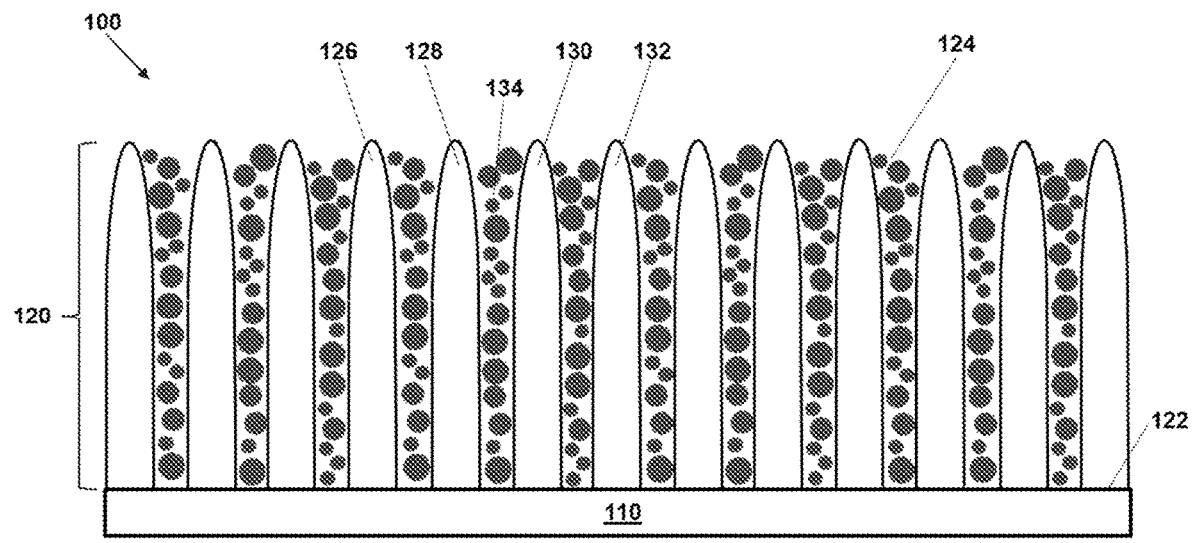
FIG. 1 is a schematic cross-sectional view of an article according to one embodiment of the disclosure.

The figures are illustrated for simplicity and clarity and have not necessarily been drawn to scale. For example, the dimensions of some of the elements in the figures can be exaggerated relative to other elements to help improve understanding of certain embodiments of the present disclosure.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An article including a durable, optically transparent, and superhydrophobic coating is described. The coating comprises a layer of aerogel disposed interstitially between spaced features extending in a direction perpendicular to a major surface of the coating, the spaced features having an average height of between 200-5000 nm and an average spacing of between 10-2000 nm, and comprising at least 75 wt. % of one or more of crystalline or amorphous silicon, an inorganic oxide, a polymer, crystalline or amorphous carbon, a carbide, or a nitride. Advantageously, the disposed aerogel, protected from shear forces by the spaced features, can significantly improve the durability and/or hydrophobicity of the coating. Moreover, the disposed aerogel, which has an index of refraction that differs only minimally (e.g. negligibly) from that of air, can limit or even prevent deposition of higher refractive index materials at the interstices of the spaced features, which could otherwise deleteriously affect the optical clarity of the coating.

"Superhydrophobic," as used herein, describes surfaces or coatings that have a water contact angle of at least about 130°. And as used herein, an "optically transparent" coating transmits at least about 90% of incident light (e.g., having a wavelength in the range of between 400-1600 nm).

In one aspect, the present disclosure provides an article comprising a substrate, and a disposed layer adjacent to the substrate, the disposed layer comprising spaced features extending in a direction perpendicular to the substrate, and between 2-40 wt. % aerogel. The aerogel is disposed interstitially between the spaced features. The spaced features have an average height of between 200-5000 nm and an average spacing of between 10-2000 nm; and comprise at least 75 wt. % of one or more of crystalline or amorphous silicon, an inorganic oxide, a polymer, crystalline or amorphous carbon, a carbide, or a nitride.

The disposed layer can have a first side facing the substrate and a second side opposite to the first side. In certain embodiments, as otherwise described herein, the first side of the disposed layer can comprise less than 50 wt. % aerogel, and the second side of the disposed layer can comprise at least 50 wt. % aerogel. In certain embodiments, the first side of the disposed layer can comprise less than 25 wt. %, or less than 10 wt. %, or less than 5 wt. % aerogel. In certain embodiments, the second side of the disposed layer can comprise at least 75 wt. %, or at least 90 wt. %, or at least 95 wt. % aerogel. For example, in certain embodiments, the first side of the disposed layer can comprise substantially (e.g., at least 90 wt. %, or at least 95 wt. %) one or more of crystalline or amorphous silicon, an inorganic oxide (e.g., silicon oxide or zinc oxide), a polymer, crystalline or amorphous carbon, a carbide (e.g., silicon carbide), or a nitride (e.g., silicon nitride), and the second side of the disposed layer can comprise at least 90 wt. %, or at least 95 wt. %, aerogel.

As described above, the aerogel is disposed interstitially between spaced features extending in a direction perpendicular to the substrate, the spaced features having an average height of between 200-5000 nm and an average spacing of between 10-2000 nm, and comprising at least 75 wt. % of one or more of crystalline or amorphous silicon, an inorganic oxide, a polymer, crystalline or amorphous carbon, a carbide, or a nitride. A person of ordinary skill in the art will appreciate that methods for forming such features, which can often be referred to as "nano-arrays," are well-known in the art. For example, such features can be formed by one or more steps of dry, wet, and/or plasma etching.

In certain embodiments, as otherwise described herein, the spaced features can comprise at least 75 wt. % (e.g., at least 85 wt. %, at least 95 wt.%, or at least 98 wt. %) of crystalline or amorphous silicon. Such features can be formed, for example, by one or more steps of dry etching (e.g., reactive ion etching, etc.) and/or wet etching (e.g., etching through immersion in a liquid chemical such as an acid, base or solvent solution, etc.) of bulk silicon disposed adjacent to a substrate.

In certain embodiments, as otherwise described herein, the spaced features can comprise at least 75 wt. % (e.g., at least 85 wt. %, at least 95 wt. %, or at least 98 wt. %) of an inorganic oxide. For example, in certain embodiments, the inorganic oxide can comprise silicon oxide. In another example, in certain embodiments, the inorganic oxide can comprise zinc oxide. Such features can be formed, for example, by one or more steps of dry etching of bulk silicon oxide or zinc oxide disposed adjacent to a substrate.

In certain embodiments, as otherwise described herein, the spaced features can comprise at least 75 wt. % (e.g., at least 85 wt. %, at least 95 wt. %, or at least 98 wt. %) of a polymer. For example, in certain embodiments, the polymer can comprise a polyhedral oligomeric silsesquioxane-based polymer. In another example, in certain embodiments, the polymer can comprise polyethylene terephthalate, polydimethylsiloxane, or polymethyl methacrylate. Such features can be formed, for example, by a lithographic method (e.g., nanoimprint lithography or hot-press imprinting).

In certain embodiments, as otherwise described herein, the spaced features can comprise at least 75 wt. % (e.g., at least 85 wt. %, at least 95 wt. %, or at least 98 wt. %) of crystalline or amorphous carbon. For example, in certain such embodiments, the carbon can comprise diamond-like carbon.

In certain embodiments, as otherwise described herein, the spaced features can comprise at least 75 wt. % (e.g., at least 85 wt. %, at least 95 wt. %, or at least 98 wt. %) of a carbide. For example, in certain such embodiments, the carbide can comprise silicon carbide. Such features can be formed, for example, by one or more dry etching steps (e.g., reactive-ion etching).

In certain embodiments, as otherwise described herein, the spaced features can comprise at least 75 wt. % (e.g., at least 85 wt. %, at least 95 wt. %, or at least 98 wt. %) of a nitride. For example, in certain embodiments, the nitride can comprise silicon nitride. Such features can be formed, for example, by one or more dry etching steps (e.g., reactive-ion etching).

In certain embodiments, as otherwise described herein, the spaced features are extended and have a cross-section perpendicular to the extended axis, the cross-section having an average width and a respective average height. In certain embodiments, the spaced features can comprise extended ridges (e.g., nanowalls). In certain embodiments, one or more of the spaced features can be relatively discrete. For example, the spaced features can be pyramid-like, post-like, or cone-like.

As described above, the spaced features have an average height of between 200-5000 nm. Where the width of the spaced features is smaller than the wavelength of incident light and the height of the spaced features is at least half of the wavelength of the incident light, the light is insensitive to the spaced features, and tends to bend progressively as if the coating has a graded index of refraction (e.g., from that of the second side, ~1, to that of the substrate). Accordingly, in certain embodiments, as otherwise described herein, the spaced features can have an average height of between 200-4000 nm, 200-2500 nm, 500-5000 nm, 500-4000 nm, or 500-2500 nm. In certain embodiments, as otherwise described herein, one or more of the spaced features can have an average width of between 25-1000 nm, e.g., 25-750 nm, 25-500 nm, 50-1000 nm, 50-750 nm, or 50-500 nm. Because such heights can be at least half of, and such widths can be smaller than the wavelength of visible, near-infrared, and/or short-wave infrared light, the coating can, effectively, have a graded index of refraction for incident visible, near-infrared, and/or short-wave infrared light.

In certain embodiments, as otherwise described herein, the average slope of one or more of the spaced features can be at most 60° from normal (as defined relative to the substrate). For example, in certain embodiments, the average slope of one or more of the spaced features can be between 0-40°, 0-30°, 0-20°, 10-60°, 20-60°, or 30-60° from normal.

In certain embodiments, as otherwise described herein, one or more of the spaced features can be cylinders having an average aspect ratio (i.e., height:width) of at least 2:1. For example, in certain embodiments, one or more of the spaced features can be cylinders having an average aspect ratio of at least 5:1, at least 10:1, or at least 20:1. A person of ordinary skill in the art will appreciate that such features can include "posts," "pillars," "nanowires," etc.

In certain embodiments, as otherwise described herein, one or more of the spaced features can extend from a first end proximal to the substrate, to a second end distal to the substrate, the second end having a diameter less than a diameter of the first end of the spaced features. In certain embodiments, as otherwise described herein, the ratio of the average height of the spaced features to the average diameter of the first end can be at least 2:1. For example, in certain embodiments, the ratio of the average height of the spaced features to the average diameter of the first end of the spaced features can be at least 5:1, 10:1, or 20:1. A person of ordinary skill in the art will appreciate that such features can include "nanocones," "tapered pillars," "pyramids," etc. In certain embodiments, the second end can be pointed (e.g., a "pointed cone"). In other embodiments, the second end can be flattened (e.g., a "truncated cone") or rounded (e.g., a "rounded cone").

As described above the average spacing of the spaced features is between 10-2000 nm. For example, in certain embodiments, the average spacing of the spaced features can be between 10-1500 nm, 10-1000 nm, 50-2000 nm, 50-1500 nm, 50-1000 nm, 100-2000 nm, 100-1500 nm, or 100-1000 nm. In certain embodiments, the spaced features can be distributed relatively uniformly (e.g., having an isotropic, unimodal distribution of spacings). In other embodiments, the spaced features can be distributed relatively non-uniformly (e.g., having an anisotropic and/or multimodal distribution of spacings).

In certain embodiments, as otherwise described herein, the average distance of each feature to its nearest neighboring feature can differ from the average spacing of the spaced features by less than 25% (e.g., less than 15%, or less than 10%). In certain embodiments, as otherwise described herein, the average distance of each feature to its nearest neighboring feature can be between 50-1000 nm (e.g., between 50-750 nm, 50-500 nm, 75-1000 nm, 75-750 nm, 75-500 nm, 100-1000 nm, 100-750 nm, or 100 -500 nm).

As described above, the disposed layer comprises aerogel. In certain embodiments, as otherwise described herein, the aerogel can comprise a plurality of aerogel particles having an average size of between 15-250 nm. In certain embodiments, as otherwise described herein, the aerogel particles can have an average size of between 15-100 nm, 15-75 nm, 25-250 nm, 25-100 nm, 25-75 nm, 40-250 nm, 40-100 nm, or 40-75 nm. The average aerogel particle size can represent an average linear dimension of the particles (e.g., an average diameter in the case of substantially spherical particles), and it may represent an average grain or crystal size, or, in the case of agglomerated particles, an average agglomerate size. In certain embodiments, the aerogel particles can have a surface area of between 600-800 $m^2/g$, and a density of between 100-200 $kg/m^3$.

An embodiment of such an article is shown in the schematic cross-sectional view found in FIG. 1. Article 100 of FIG. 1 includes a substrate 110 and a disposed layer 120 having a first side 122 adjacent the substrate 110 and an opposed second side 124. Disposed layer 120 includes aerogel present in the form of a plurality of aerogel particles 134, disposed interstitially between spaced features of the layer 120, including tapered pillars 126, 128, 130, 132.

The aerogel particles may be obtained by processing precursor powder to reduce the average particle size, e.g., to about 100 nm or smaller. The aerogel nanoparticles may include nanoscale surface asperities, i.e., a nanoscale surface texture characterized by protruding or sharp features separated by recessed features and/or pores at the particle surface. A person of ordinary skill in the art will appreciate that the scale of the surface texture is smaller than the average size of the particle; generally, surface asperities are at least about 50% smaller. For example, aerogel particles of about 100 nm in average particle size may include surface asperities of about 50 nm in average size or less, and hydrophobic particles of about 50 nm in average particle size may include surface asperities of about 25 nm in size or less.

Suitable aerogel precursor powders are commercially available from a number of sources, including Cabot Corp. (Boston, Mass.). Suitable aerogel precursor powders are sold under the Nanogel® Aerogel, LUMIRA® Aerogel and ENOVA® Aerogel trade names, and include, for example ENOVA™ Aerogel IC 3110, ENOVA™ Aerogel MT 1100, ENOVA™ Aerogel MT 1200, ENOVA™ Aerogel IC 3120. These porous, nanostructured particles are available in particle sizes ranging from about 5 microns to 4 mm, but may be mechanically milled or sonicated, as discussed below, to obtain particles of reduced sizes (e.g., 10-90 nm) suitable for the interstices between the spaced features, as otherwise described herein.

In other embodiments as described herein, the aerogel comprises one or more continuous aerogel domains extending at least 500 nm in a direction parallel to the substrate. As used herein, "aerogel domains" can include discrete moieties comprising at least 50 wt. % (e.g., at least 75 wt. %, at least 90 wt. %, or at least 95 wt. %) aerogel. Aerogel domains can also include other components such as, binders, aerogel precursors, impurities, etc.

Figure 2:
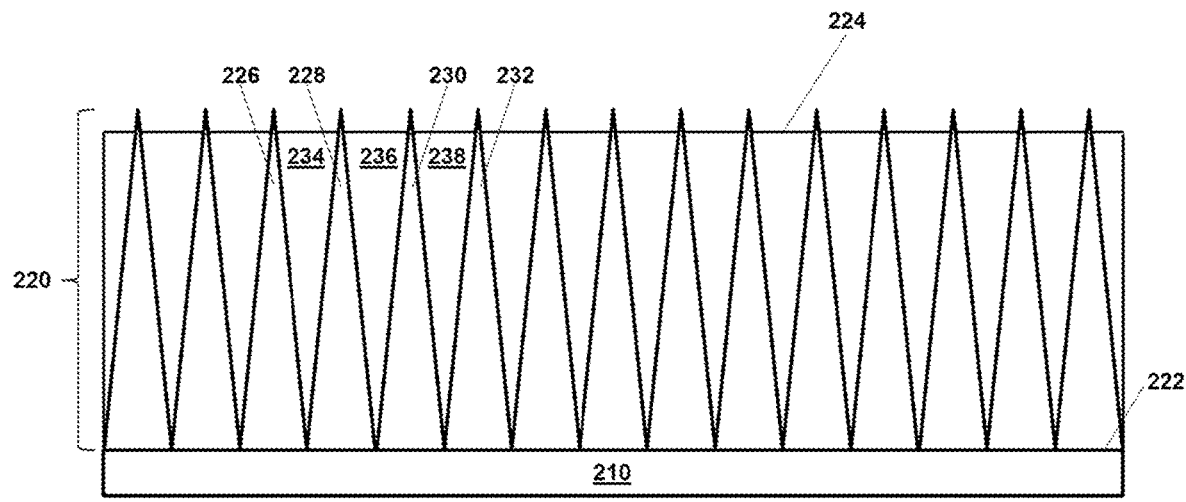
FIG. 2 is a schematic cross-sectional view of an article according to one embodiment of the disclosure.

An embodiment of such an article is shown in the schematic cross-sectional view found in FIG. 2. Article 200 of FIG. 2 includes a substrate 210 and a disposed layer 220 having a first side 222 adjacent the substrate 210 and an opposed second side 224. Disposed layer 220 includes aerogel present in the form of continuous aerogel domains 234, 236, 238, disposed interstitially between spaced features of the layer 220, including pointed cones 226, 228, 230, 232.

For example, in certain embodiments, the aerogel can comprises one or more continuous aerogel domains extending, on average, at least 1 μm, at least 5 μm, at least 10 μm, at least 100 μm, at least 250 μm, or at least 500 μm. Such domains can be formed, for example, by providing an aerogel precursor (e.g., a sol-gel network) disposed adjacent to at least a portion of a textured surface of a precursor layer comprising spaced features, as otherwise described herein, and converting at least a portion of the aerogel precursor to an aerogel (e.g., by supercritical solvent extraction from the sol-gel network).

In certain embodiments, as otherwise described herein, the aerogel can be a silica aerogel. In other embodiments, the aerogel can be a type other than silica, such as, for example, a metal oxide aerogel or an organic aerogel.

In certain embodiments, as otherwise described herein, the substrate can comprise a glass. For example, in certain such embodiments, the substrate can comprise a silicate glass, e.g., an alkali borosilicate glass, or an alkali aluminosilicate glass.

In certain embodiments, as otherwise described herein, the disposed layer can comprise a hydrophobic material. In certain embodiments, as otherwise described herein, the article can comprise an interface between the aerogel and the spaced features, and a hydrophobic silane, the hydrophobic silane being present at the interface between the aerogel and the spaced features. In certain embodiments, as otherwise described herein, the hydrophobic silane can be covalently linked to the spaced features.

Such interfacial hydrophobic silanes can be obtained by treating at least a portion of a textured surface comprising a spaced features with one or more compounds selected from organosilanes, fluorinated silanes, and disilazanes (e.g., before disposing an aerogel adjacent to at least a portion of the treated surface). Such treatment can include, for example, covalently linking the one or more compounds to the surface, or in another example, depositing a thin (e.g., between 0.5-5 nm) film of the one or more compounds onto the surface.

Suitable organosilanes include, but are not limited to: alkylchlorosilanes; alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, and polytriethoxysilane; trialkoxyarylsilanes; isooctyltrimethoxy-silane; N-(3-triethoxysilylpropyl) methoxyethoxyethyl carbamate; N-(3-triethoxysilylpropyl)methoxyethoxyethyl carbamate; polydialkylsiloxanes including, polydimethylsiloxane; arylsilanes including substituted and unsubstituted arylsilanes; alkylsilanes including substituted and unsubstituted alkyl silanes including methoxy and hydroxy substituted alkyl silanes; and combinations thereof. Suitable alkylchlorosilanes can include: methyltrichlorosilane, dimethyldichlorosilane, trimethylchlorosilane, octylmethyldichlorosilane, octyltrichlorosilane, octadecylmethyldichlorosilane and octadecyltrichlorosilane. Other suitable materials can include: methylmethoxysilanes, such as methyltrimethoxysilane, dimethyldimethoxysilane and trimethylmethoxysilane; methylethoxysilanes, such as methyltriethoxysilane, dimethyldiethoxysilane and trimethylethoxysilane; methylacetoxysilanes such as methyltriacetoxysilane, dimethyldiacetoxysilane and trimethylacetoxysilane; vinylsilanes such as vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane and vinyldimethylethoxysilane.

Suitable fluorinated silanes can include: fluorinated alkyl-, alkoxy-, aryl- and/or alkylaryl-silanes, and fully perfluorinated alkyl-, alkoxy-, aryl- and/or alkylaryl-silanes. An example of a suitable fluorinated alkoxy-silane is perfluorooctyltrimethoxysilane.

Suitable disilazanes can include: hexamethyldisilazane, divinyltetramethyldisilazane and bis(3,3-trifluoropropyl)tetramethyldisilazane. Cyclosilazanes are also suitable, and can include: octamethylcyclotetrasilazane.

In certain embodiments, as otherwise described herein, the disposed layer can have an average thickness of between 400-5000 nm. For example, in certain embodiments, as otherwise described herein, the disposed layer can have an average thickness of between 400-3000 nm, 400-2000 nm, 500-5000 nm, 500-3000 nm, 500-2000 nm, 750-5000 nm, 750-3000 nm, or 750-2000 nm.

The disposed layer can be transparent to visible, near-infrared, and short-wave infrared light. Accordingly, in certain embodiments, as otherwise described herein, the disposed layer can have a light transmissivity of at least 90% (e.g., at least 95%, at least 98%, or at least 99%) for wavelengths between 400 nm and 1600 nm. In certain embodiments, as otherwise described herein, the disposed layer can have a light transmissivity of at least 95% (e.g., at least 98%, at least 99%, or at least 99.5%) for wavelengths between 400 nm and 940 nm.

As noted above, the present inventors have determined that the disposed layer can desirably be superhydrophobic. Accordingly, in certain embodiments, as otherwise described herein, the second side of the disposed layer can have a water contact angle of at least 130° (e.g., at least 140°, or at least 150°).

Another aspect of the disclosure is a method for preparing a coated substrate comprising providing a precursor layer disposed on a substrate, the precursor layer having a first side facing the substrate and a second side opposite to the first side, the second side having a textured surface, the textured surface comprising a spaced features extending in a direction perpendicular to the substrate. The spaced features have an average height of between 200-5000 nm and an average spacing of between 10-2000 nm; and comprise at least 75 wt. % of one or more of crystalline or amorphous silicon, an inorganic oxide, a polymer, crystalline or amorphous carbon, a carbide, or a nitride. The method further includes disposing aerogel adjacent to at least a portion of the textured surface.

A person of ordinary skill in the art will appreciate that the textured surface of the precursor layer (i.e., inclusive of the spaced features of the textured surface) comprises a surface roughness. As used herein, surface roughness includes the "vertical" variation of the height of a surface (i.e., perpendicular to the major dimensions of the surface) and the "horizontal" variation of the height of a surface (i.e., parallel to the major dimensions of the surface). A person of ordinary skill in the art will further appreciate that root-mean-square (RMS) roughness can describe a "vertical" roughness, while a "horizontal" roughness can be characterized by a height-height correlation length (horizontal correlation length;

In certain embodiments, as otherwise described herein, the textured surface of the precursor layer can comprise a surface roughness having an RMS aroughness of between 200-5000 nm. For example, in certain embodiments, as otherwise described herein, the RMS roughness of the textured surface can be 200-4000 nm, 200-2500 nm, 500-5000 nm, 500-4000 nm, or 500-2500 nm.

In certain embodiments, as otherwise described herein, the textured surface of the precursor layer comprises a surface roughness that can have a height-height correlation length of between 25-1000 nm. For example, in certain embodiments, as otherwise described herein, the height-height correlation length of the textured surface can be between 25-750 nm, 25-500 nm, 50-1000 nm, 50-750 nm, or 50-500 nm.

A person of ordinary skill in the art will appreciate that the textured surface comprises a distribution of slopes. The slope distribution of the textured surfaces described herein can be non-normal, and can be unimodal or multimodal. In certain embodiments, as otherwise described herein, the textured surface can comprise a slope distribution including at least one mode that is at most 60° from normal (as defined relative to the substrate). For example, in certain embodiments, the textured surface can comprise a slope distribution including at least one mode that is at most 50° from normal, or at most 40° from normal. In certain embodiments, the textured surface can comprise a slope distribution including at least one mode that is between 0-40°, 0-30°, 0-20°, 10-60°, 20-60°, 30-60° from normal.

In certain embodiments, as otherwise described herein, one or more of the spaced features of the precursor layer can be cylinders having an average aspect ratio (i.e., height: width) of at least 2:1. For example, in certain embodiments, one or more of the spaced features can be cylinders having an average aspect ratio of at least 5:1, at least 10:1, or at least 20:1. A person of ordinary skill in the art will appreciate that such features can include "posts," "pillars," "nanowires," etc.

In certain embodiments, as otherwise described herein, the one or more of the spaced features of the precursor layer can extend from a first end proximal to the substrate, to a second end distal to the substrate, the second end having a diameter less than a diameter of the first end of the spaced features. In certain embodiments, as otherwise described herein, the ratio of the average height of the spaced features to the average diameter of the first end can be at least 2:1. For example, in certain embodiments, the ratio of the average height of the spaced features to the average diameter of the first end of the spaced features can be at least 5:1, at least 10:1, or at least 20:1. A person of ordinary skill in the art will appreciate that such features can include "nanocones," "tapered pillars," "pyramids," etc. In certain embodiments, the second end can be pointed (e.g., a "pointed cone"). In other embodiments, the second end can be flattened (e.g., a "truncated cone") or rounded (e.g., a "rounded cone," or a "tapered pillar").

As described above, in certain embodiments, as otherwise described herein, the average spacing of the spaced features can be between 10-2000 nm. For example, in certain such embodiments, the average spacing of the spaced features can be between 10-1500 nm, 10-1000 nm, 50-2000 nm, 50-1500 nm, 50-1000 nm, 100-2000 nm, 100-1500 nm, or 100-1000 nm. In certain embodiments, the spaced features can be distributed relatively uniformly (e.g., having an isotropic, unimodal distribution of spacings). In other embodiments, the spaced features can be distributed relatively non-uniformly (e.g., having an anisotropic and/or multimodal distribution of spacings).

In certain embodiments, as otherwise described herein, the average distance of each feature to its nearest neighboring feature can differ from the average spacing of the spaced features by less than 25% (e.g., less than 15%, or less than 10%). In certain embodiments, as otherwise described herein, the average distance of each feature to its nearest neighboring feature can be between 50-1000 nm (e.g., between 50-750 nm, 50-500 nm, 75-1000 nm, 75-750 nm, 75-500 nm, 100-1000 nm, 100-750 nm, or 100-500 nm).

In certain embodiments, as otherwise described herein, the layer can have an average thickness of between 400-5000 nm. For example, in certain embodiments, as otherwise described herein, the precursor layer can have an average thickness of between 400-3000 nm, 400-2000 nm, 500-5000 nm, 500-3000 nm, 500-2000 nm, 750-5000 nm, 750-3000 nm, or 750-2000 nm.

In certain embodiments, as otherwise described herein, the substrate comprises a glass. For example, in certain such embodiments, the substrate comprises a silicate glass (e.g., an alkali borosilicate glass, or an alkali aluminosilicate glass).

In certain embodiments, as otherwise described herein, at least a portion of the textured surface of the precursor layer can comprise a hydrophobic silane. In certain such embodiments, the hydrophobic silane can be covalently linked to the spaced features. In certain embodiments, as otherwise described herein, the hydrophobic silane can comprise, or can be derived from, one or more compounds selected from organosilanes, fluorinated silanes, and disilazanes.

In certain embodiments, as otherwise described herein, disposing the aerogel can comprise forming a sol-gel network (i.e., by a sol-gel process) adjacent to at least a portion of the textured surface, and drying the sol-gel network to form an aerogel. For example, in certain embodiments, as otherwise described herein, disposing the aerogel can comprise reacting a silicon alkoxide and water in the presence of a catalyst on the textured surface to form a sol-gel network disposed interstitially between the spaced features of the textured surface, and then forming an aerogel by supercritical solvent extraction of the sol-gel network. In certain embodiments, as otherwise described herein, the silicon alkoxide can comprise tetramethoxysilane or tetraethoxysilane. In certain embodiments, as otherwise described herein, the catalyst can comprise ammonium hydroxide or ammonium fluoride. For example, in certain embodiments, the silicon alkoxide can be tetraethoxysilane, and the catalyst can be ammonium fluoride. In certain embodiments, as otherwise described herein, the silicon alkoxide, catalyst, and water can be reacted in an alcohol solvent (e.g., ethanol).

In other embodiments, disposing aerogel can comprise disposing a suspension of aerogel particles adjacent to at least a portion of the textured surface (e.g., disposed interstitially between the spaced features of the textured surface), and then drying the suspension. In certain such embodiments, the average size of the aerogel particles can be between 15-250 nm (e.g., 15-100 nm, 15-75 nm, 25-250 nm, 25-100 nm, 25-75 nm, 40-250 nm, 40-100 nm, or 40-75 nm). In certain embodiments as otherwise described herein, the aerogel particles can be suspended in an alcohol (e.g., ethanol).

In certain embodiments, as otherwise described herein, the aerogel can be a silica aerogel. In other embodiments, the aerogel can be a type other than silica, such as, for example, a metal oxide aerogel or an organic aerogel.

Advantageously, disposing aerogel as described herein can provide a smoothed surface in which each of the aerogel, which exhibits high compressive strength and hydrophobicity, and the spaced features can protect the other from shear forces. Due to the particularly low density of aerogel, the index of refraction of the resulting material can differ only minimally (or even negligibly) from that of the precursor layer alone, while remaining desirably resistant to deposition of high refractive index materials at the interstices of the spaced features.

Accordingly, in certain embodiments, as otherwise described herein, disposing aerogel can form a smoothed surface separated from the substrate by the precursor layer, the smoothed surface comprising a surface roughness having an RMS roughness of at most 200 nm. For example, in certain embodiments, the smoothed surface can comprise a surface roughness having an RMS roughness of at most 150 nm, at most 100 nm, at most 75 nm, or at most 50 nm. In certain embodiments, as otherwise described herein, the smoothed surface can comprise at least 50 wt. % aerogel. For example, in certain such embodiments, the smoothed surface can comprise at least 60 wt. %, at least 70 wt. %, at least 75 wt. %, or at least 80 wt. % aerogel.

The methods described herein can desirably provide a durable, optically transparent, and superhydrophobic coating. Accordingly, another aspect of the disclosure is a coating (e.g., prepared according to a method described herein) disposed adjacent a substrate and comprising a layer of aerogel disposed interstitially between spaced features extending in a direction perpendicular to the substrate, the spaced features having an average height of between 200-5000 nm and an average spacing of between 10-2000 nm, and comprising at least 75 wt. % of one or more of crystalline or amorphous silicon, an inorganic oxide, a polymer, crystalline or amorphous carbon, a carbide, or a nitride. The properties of the various components of the coating can be as otherwise described above with respect to the methods of the disclosure.

While various examples and embodiments have been disclosed, other examples and embodiments will be apparent to those skilled in the art. The various disclosed examples and embodiments are for purposes of illustration and are not intended to be limiting, with the true scope being indicated by the following claims.

The invention claimed is:

1. An article comprising:
   a substrate; and
   a disposed layer adjacent to the substrate, the disposed layer comprising:
      spaced features extending in a direction perpendicular to the substrate, and
      between 2-40 wt. % aerogel,
   wherein:
      the aerogel is disposed interstitially between the spaced features,
      the spaced features have an average height of between 200-5000 nm and an average spacing of between 10-2000 nm,
      the spaced features comprise at least 75 wt. % of one or more of crystalline or amorphous silicon, an inorganic oxide, a polymer, crystalline or amorphous carbon, a carbide, or a nitride, and
      the spaced features are covalently linked to a hydrophobic silane.

2. The article of claim 1, wherein one or more of the spaced features have an average height of between 500-5000 nm.

3. The article of claim 1, wherein one or more of the spaced features have an average width of between 25-1000 nm.

4. The article of claim 1, wherein one or more of the spaced features have an average slope of at most 60° from normal.

5. The article of claim 1, wherein one or more of the spaced features have an average height-to-width aspect ratio of at least 2:1.

6. The article of claim 1, wherein:
   one or more of the spaced features extends from a first end proximal to the substrate, to a second end distal to the substrate, the second end having a diameter less than a diameter of the first end; and
   the ratio of the average height of the spaced features to an average diameter of the first end of the spaced features is at least 2:1.

7. The article of claim 1, wherein one or more of the spaced features are cones or pyramids.

8. The article of claim 1, wherein an average distance of each spaced feature to its nearest neighboring feature is within the range of between 50-1000 nm.

9. The article of claim 1, wherein the spaced features comprise an isotropic, unimodal distribution of spacings.

10. The article of claim 1, wherein the aerogel comprises a plurality of aerogel particles having an average size of between 15-250 nm.

11. The article of claim 1, wherein the aerogel comprises one or more continuous aerogel domains extending at least 500 nm in a direction parallel to the substrate.

12. The article of claim 1, wherein the disposed layer is transparent to visible light and near-infrared light.

13. The article of claim 1, wherein:
   the disposed layer has a first side facing the substrate and a second side opposite to the first side, and
   the second side of the disposed layer has a water contact angle of at least 130°.

14. The article of claim 1, wherein:
   the disposed layer has a first side facing the substrate and a second side opposite to the first side, and
   the second side of the disposed layer comprises a surface roughness having a root-mean-square roughness of at most 200 nm.

15. The article of claim 1, wherein:
   the disposed layer has a first side facing the substrate and a second side opposite to the first side, and
   the disposed layer has a graded index of refraction from, at the second side, an ambient index of refraction to, at the first side, an index of refraction of the substrate.

16. The article of claim 1, wherein the hydrophobic silane is covalently linked to a surface of the spaced features.

17. The article of claim 1, wherein the hydrophobic silane comprises at least one of an organosilane, a fluorinated silane, or a disilazane.

18. The article of claim 1, wherein the hydrophobic silane comprises an organosilane, wherein the organosilane is selected from the group consisting of alkylchlorosilanes, alkoxysilanes, polydialkylsiloxanes, arylsilanes, alkylsilanes, methylmethoxysilanes, methylethoxysilanes, methylacetoxysilanes, and vinylsilanes.

19. The article of claim 1, wherein the hydrophobic silane comprises a fluorinated silane, wherein the fluorinated silane is selected from the group consisting of fluorinated alkylsilanes, fluorinated alkoxysilanes, fluorinated arylsilanes, fluorinated alkylarylsilanes, perfluorinated alkylsilanes, perfluorinated alkoxysilanes, perfluorinated arylsilanes, and perfluorinated alkylarylsilanes.

20. The article of claim 1, wherein the hydrophobic silane comprises a disilazane, wherein the disilazane is selected from the group consisting of hexamethyldisilazane, divinyltetramethyldisilazane, and bis(3,3-trifluoropropyl)tetramethyldisilazane.

* * * * *